US006391464B1

(12) United States Patent
Harblin

(10) Patent No.: US 6,391,464 B1
(45) Date of Patent: May 21, 2002

(54) EPOXY COATINGS AND SURFACES COATED THEREWITH

(75) Inventor: Owen Maynard Harblin, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/592,484

(22) Filed: Jun. 8, 2000

Related U.S. Application Data

(62) Division of application No. 09/216,773, filed on Dec. 21, 1998, now Pat. No. 6,110,536.

(51) Int. Cl.$^7$ .......................... B32B 27/38; B32B 33/00; B32B 9/04
(52) U.S. Cl. ...................... 428/447; 428/448; 428/446; 428/450; 428/451
(58) Field of Search ................................ 428/447, 448, 428/446, 450, 451

(56) References Cited

U.S. PATENT DOCUMENTS

| | | | |
|---|---|---|---|
| 4,025,693 A | 5/1977 | Milne | 106/15 R |
| 4,080,190 A | 3/1978 | Law et al. | 427/387 |
| 4,227,929 A | 10/1980 | Law et al. | 424/184 |
| 4,233,428 A | * 11/1980 | Endo | 525/507 |
| 5,449,553 A | 9/1995 | Griffith | 428/332 |
| 5,691,019 A | * 11/1997 | Carroll et al. | 428/40.1 |

FOREIGN PATENT DOCUMENTS

| | | |
|---|---|---|
| EP | 496552 A1 | 1/1992 |
| EP | 532273 A1 | 9/1992 |
| EP | 881269 A2 | 3/1998 |
| JP | 03-258876 | * 11/1991 |
| WO | WO 95/32862 | * 12/1995 |

OTHER PUBLICATIONS

Kohl et al, Proc. Annu. Meet. Adhes. Soc., 21st, pp 135–137, 1998.*
Burkus et al, Pitture Vernici Eur. 73(15), pp 54–55, 57–59, 62–63,66–67, 1997.*

* cited by examiner

*Primary Examiner*—Erma Cameron
(74) *Attorney, Agent, or Firm*—Bernadette M. Bennett; Noreen C. Bennett

(57) ABSTRACT

A method is provided for treating anti-corrosive steel surfaces, such an epoxy-coated ship's hull, in an environmentally improved manner, with an epoxy-silicone-adhesive paint, as a tiecoat, to provide for the subsequent application of silicone foul release coatings.

9 Claims, No Drawings

EPOXY COATINGS AND SURFACES COATED THEREWITH

CROSS-REFERENCE TO RELATED APPLICATIONS

This application is a division to Non-Provisional Application Ser. No. 09/216,773 entitled "Method of Modifying Epoxy-Coated Ship's Hull Surfaces, and Surfaces Obtained Thereby," filed on Dec. 21, 1998, now U.S. Pat. No. 6,110, 536, which is incorporated herein by reference.

STATEMENT REGARDING FEDERALLY SPONSORED RESEARCH AND DEVELOPMENT

This invention was made with government support under Contract No. N00014-95-C-6024 awarded by the U.S. Government. The government has certain rights in this invention.

BACKGROUND OF THE INVENTION

The present invention relates to a method of treating an epoxy resin coated metallic substrate, such as a ship's hull, with an epoxy-silicone-adhesive paint as an intermediate tie-layer to effect the bonding of subsequently applied duplex silicone foul release coatings.

Metallic structures submerged in sea water, such as ship bottoms, are generally infested with organisms, such as barnacles, tube worms, and algae, which can become attached to the surface of these structures causing increased fuel consumption due to increased drag. Routinely, anti-fouling paints are used to treat the surface of these exposed substrates to minimize corrosion. Silicones have been known as effective anti-fouling coatings as early as the 1970's, as shown by U.S. Pat. Nos. 4,025,693, 4,080,190 and 4,227,929.

In Griffith, U.S. Pat. No. 5,449,553, which is incorporated herein by reference, a nontoxic anti-fouling system is described which involves the application of a silicone room temperature vulcanizable (RTV) condensation cure composition, for example, GE RTV 11, as a topcoat, which interfaces with sea water, and which is anchored onto a semi-cured organo-silicon condensation cure RTV bonding layer. An example of a semi-cured RTV condensation cure bonding layer is Silgan J-501 of the Wacker Silicones Corporation of Adrian, Mich., as shown in the aforesaid Griffith, U.S. Pat. No. 5,449,553. The semi-cured RTV condensation cure bonding layer is directly applied, and is in contact with the epoxy treated metallic substrate, such as a ship's hull, and can serve as an anchor for a subsequently applied silicone condensation cure RTV topcoat.

The combination of these condensation cure RTV's has been found to be effective as a duplex non-toxic silicone foul release system when properly secured to a ship's hull. The application of the duplex non-toxic silicone foul release system is preferably made under ambient conditions onto an epoxy-coated metallic substrate, for example a ship's hull, which has been thoroughly cleaned, sand blasted to metallic substrate, and then freshly coated with an epoxy resin.

Experience has shown that even though adhesion between the silicone room temperature vulcanizable (RTV) composition which interfaces with sea water, and the aforementioned silicone-organic bonding layer in the dual silicone foul release system is generally satisfactory, adhesion between the silicone bonding layer and the epoxy coating on the metallic substrate is often unsatisfactory.

A procedure which has been developed to improve adhesion between the silicone-bonding layer and the epoxy resin coating on a metallic substrate, such as a ship's hull, is based on the use of an equal parts mixture of butanol and a curable epoxy resin mixture, referred to sometimes as "epoxy mistcoat". In making the epoxy mistcoat, there is used in combination with butanol, an epoxy resin paint, which may contain Epon 828 resin and an amine curing catalyst for the epoxy resin, such as VERSAMID 140 of the Henkel Coporation of Ambler, Pa. As a result of applying the epoxy mistcoat directly onto the epoxy-coated ship's hull, a binary epoxy layer is formed prior to the application of the duplex non-toxic silicone foul release system. While an improvement in adhesion has been found to occur between the resulting binary epoxy layer, and the subsequently applied silicone-organic bonding layer, considerable environmental concerns have been recognized as a result of butanol emissions. In addition, special mixing procedures, and time restrictions have been found necessary to achieve satisfactory bonding between the epoxy mistcoat and the silicone-organic bonding layer.

Additional techniques are therefore needed to provide an environmentally safe and efficient method to satisfactorily anchor the duplex silicone foul release coating system onto an epoxy-coated ship's hull.

BRIEF SUMMARY OF THE INVENTION

The present invention is based on the discovery that an epoxy-silicone mixture, referred to hereinafter as the "epoxy-silicone-adhesive-paint", can be applied in an environmentally safe manner onto an epoxy-coated metallic substrate, such as a steel or aluminum ship's hull, to form an effective foundation coating to anchor the subsequently applied silicone-bonding layer, which thereafter can be further treated with a condensation cure silicone RTV foul release topcoat to form the duplex silicone foul release system as previously described.

The epoxy-silicone-adhesive-paint, comprises a blend of an epoxy paint, and an effective amount of a silicone adhesion promoter. The silicone adhesion promoter comprises a mixture of a hydrocarbon solvent, for example, mineral spirits, in combination with an RTV silicone condensation cure catalyst system, i.e. a partially condensed organosilicate, a uniformly dispersed, or solubilized metallic catalyst, such as dibutyl tin oxide, and an effective amount of an alkylaminotrialkoxysilane, such as γ-aminopropyltrimethoxysilane.

STATEMENT OF THE INVENTION

There is provided by the present invention, a method of modifying under atmospheric conditions, a metallic substrate coated with a cured epoxy resin to allow the subsequent application thereon of a duplex silicone foul release coating, which comprises the steps of, (a) applying onto the cured epoxy resin coated metallic substrate, an epoxy-silicone-adhesive paint comprising by weight, (i) 80–85% of an epoxy resin paint, and (ii) 15–20% by weight of a silicone adhesive promoter, comprising a volatile hydrocarbon solvent, a partially condensed organosilicate, a solubilized metallic catalyst, and an aminoalkyltrialkoxysilane, where the aminoalkyltrialkoxysilane is present in the silicone adhesive promoter in an amount which is at least sufficient to impart to the epoxy-silicone-adhesive paint upon cure to at least a tacky state, a degree of adhesion sufficient to satisfactorily anchor a subsequently applied condensation cure RTV, or when allowed to achieve a tack-free state, provide a cohesive failure value in accordance with ASTM D-4541.

There is also provided by the present invention, an epoxy-silicone-adhesive paint comprising an epoxy resin paint, and an effective amount of an aminoalkyltrialkoxysilane based on the weight of epoxy resin. There is also provided by the present invention, the substrate obtained by treating by the method hereinabove.

DETAILED DESCRIPTION OF THE INVENTION

The expression "silicone condensation cure RTV compositions" as used in the present invention, means liquid silicone mixtures, which are often manufactured as "two-part" mixtures. The expression "two-part silicone RTV" as used in the present invention means that liquid silicone mixtures, referred to sometimes as "part one" and "part two", can be converted from the liquid state to the elastomeric, or rubber state, when combined at room temperature.

In part one, there is generally employed a silanol- terminated polydiorganosiloxane, such as a silanol-terminated polydimethylsiloxane along with a filler, for example calcium carbonate. In part two, a curing agent, such as a metallic salt of a carboxylic acid, or metallic compound can be used. While tin oxide, for example, dibutyl tin oxide is preferred, other metallic compounds, such as salts of lead, zirconium, antimony, and manganese, in combination with acid radicals such as acetate, butyrate, octoate have been found effective. These compounds can be used with a partially condensed organosilicate, for example an alkylsilicate, such as an ethylsilicate. A more detailed description can be found in Griffith, U.S. Pat. No. 5,449,553, which is incorporated herein by reference.

In addition to the above described ingredients, the respective parts of the two-part silicone RTV often contain major amounts of organic solvents, such as hydrocarbon solvents, for example mineral spirits, to facilitate application of these paint-like materials.

The epoxy-silicone-adhesive paint is preferably made by thoroughly blending SCM501C, a silicone adhesive of GE Silicones, Waterford, N.Y., with a suitable epoxy resin paint, such as AMERLOCK 400 FD, of the Ameron Co. of Brea, Calif. After the various ingredients have been thoroughly mixed, the resulting mixture can be applied at thicknesses of 4–10 mils, and preferably 6–8 mils, such as by spraying, as a second coat onto the surface of an epoxy-coated steel substrate. Effective bonding of the silicone bonding layer onto the treated epoxy substrate can be achieved after evaporation of volatiles as long as a tacky condition of the epoxy-silicone-adhesive layer is maintained. This feature can allow adequate work time, such as up to 20 hours or more.

While the aminoalkyltrialkoxysilane used in the practice of the invention is preferably γ-aminopropyltrimethoxysilane, other aminoalkyltrialkoxysilanes can be used such as, $NH_2RSi(OR^1)_3$, where R is methylene, dimethylene, or $C_{(4-8)}$ alkylene, and $R^1$ is $C_{(2-8)}$ alkyl resin in the epoxy-silicone-adhesive paint.

In order that those skilled in the art will be better able to practice the present invention, the following examples are given by way of illustration, and not by way of limitation. All parts are by weight unless otherwise indicated.

EXAMPLE 1

An epoxy-silicone-adhesive paint is prepared by thoroughly mixing together AMERLOCK 400 FD epoxy resin paint of the Ameron Co. of Brea, Calif., and 15% by weight of a silicone adhesion promoter. The silicone adhesion promoter, SCM501C, is a product of GE Silicones, Waterford, N.Y., and consists essentially of 62% by weight of mineral spirits, 11.3% of partially condensed ethyl silicate, 3.8% of solubilized dibutyl tin oxide, and 22.5% of γ-aminopropyltrimethoxysilane. The resulting epoxy-silicone-adhesive paint is sprayed onto a 6 inch×6 inch epoxy resin coated steel test panel. There is obtained a steel panel having a dual epoxy coating, and a 6–8 mil second coat. The resulting painted panel is allowed to air cure to a tacky state after four hours under ambient conditions.

There is painted onto the dual epoxy-coated steel panel, a silicone-bonding RTV composition, Silgan J-501 of the Wacker Silicones Corporation. A coating is formed after three hours which shows excellent adhesion to the dual epoxy-coated steel panel.

EXAMPLE 2

A epoxy-silicone-adhesive paint is prepared in accordance with example 1, consisting of AMERLOCK 400 FD epoxy resin paint, and 15% by weight of the silicone adhesion promoter. The paint blend is sprayed onto a 6 inch×6 inch steel test panel which is initially coated with a cured epoxy resin paint. There is obtained a steel panel having a dual epoxy coating with a 6–8 mil second coat.

Steel adhesion dollies are imbedded into the surface of the second paint coating on the steel panel surface. After a four-day cure time, the adhesion dollies are pulled using hydraulic adhesion testing equipment. The adhesion measurements are obtained in accordance with ASTM D-4541 for portable adhesion, using HATE MARK IV test equipment of KTA Company, Pittsburgh, Pa. It is found that cohesive failure occurs in the cured adhesion promoter mixture at 300–325 psi, where cohesive means that a breakdown in the topcoat wall occurs instead of separation between topcoat and tiecoat.

What is claimed is:

1. A substrate comprising a metallic substrate coated with a cured epoxy resin, an epoxy-silicone-adhesive paint which is applied directly onto the surface of the epoxy-coated metallic substrate, and a two-part silicone condensation cure room temperature vulcanizable composition which is applied directly onto the epoxy-silicone-adhesive paint;

wherein the epoxy-silicone-adhesive paint comprises by weight (i) an epoxy resin paint in a range between about 80% and about 85%, and (ii) a silicone adhesive promoter in a range between about 15% and about 20%, wherein the promoter comprises a volatile hydrocarbon solvent, a partially condensed organosilicate, a solubilized metallic catalyst, and an aminoalkyltrialkoxysilane.

2. The substrate of claim 1 which is a ship's hull.

3. The substrate in accordance with claim 1, wherein the aminoalkyltrialkoxysilane is γ-aminopropyltrimethoxysilane.

4. The substrate in accordance with claim 1, wherein the organosilicate is an alkylsilicate.

5. The substrate in accordance with claim 4, wherein the alkylsilicate is ethylsilicate.

6. The substrate in accordance with claim 1, wherein the metallic catalyst is dibutyl tin oxide.

7. The substrate in accordance with claim 1, wherein the solvent is mineral spirits.

8. The substrate in accordance with claim 1, wherein the epoxy-silicone-adhesive coating is subsequently coated with a two-part silicone condensation cure room temperature vulcanizable composition.

9. A ship's hull comprising a metallic substrate coated with a cured epoxy resin, an epoxy-silicone-adhesive paint which is applied directly onto the surface of the epoxy-coated metallic substrate, and a two-part silicone condensation cure room temperature vulcanizable composition which is applied directly onto the epoxy-silicone-adhesive paint; wherein the epoxy-silicone-adhesive paint comprises by weight (i) an epoxy resin paint in a range between about 80% and about 85%, and (ii) a silicone adhesive promoter in a range between about 15% and about 20%, wherein the promoter comprises a mineral spirits, ethylsilicate, dibutyl tin oxide, and γ-aminopropyltrimethoxysilane.

* * * * *